May 4, 1926.

J. H. DUERDEN 1,583,343

GRIP FOR CORDS, ROPES, AND THE LIKE

Filed Oct. 1, 1925  2 Sheets-Sheet 1

James Henry Duerden
INVENTOR.

by Monroe E Miller
Atty.

May 4, 1926. 1,583,343
J. H. DUERDEN
GRIP FOR CORDS, ROPES, AND THE LIKE
Filed Oct. 1, 1925   2 Sheets-Sheet 2
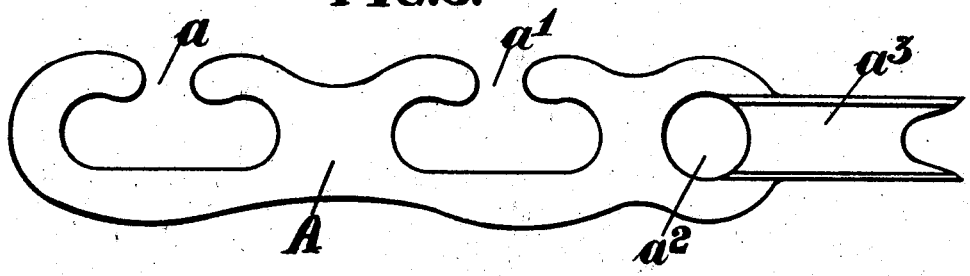
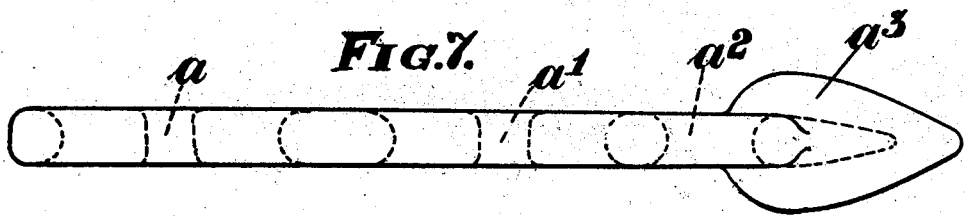
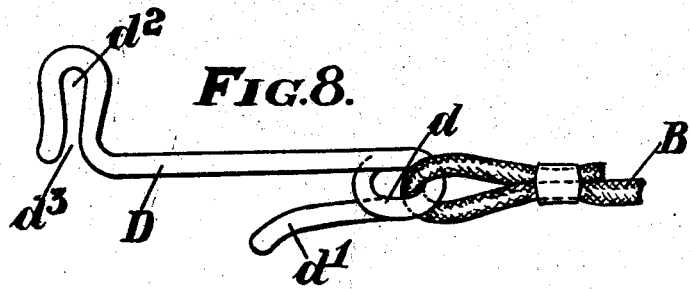

Patented May 4, 1926.

1,583,343

UNITED STATES PATENT OFFICE.

JAMES HENRY DUERDEN, OF BURNLEY, ENGLAND, ASSIGNOR OF ONE-HALF TO HERBERT POLLARD COOPER, OF BURNLEY, ENGLAND.

GRIP FOR CORDS, ROPES, AND THE LIKE.

Application filed October 1, 1925. Serial No. 59,942.

*To all whom it may concern:*

Be it known that I, JAMES HENRY DUERDEN, a subject of the King of Great Britain, residing at Burnley, in the county of Lancaster, England, have invented certain new and useful Improvements Relating to a Grip for Cords, Ropes, and the like, of which the following is a specification.

This invention relates to a grip for cords, ropes and the like herein referred to as cords, and has for its chief object to introduce a simple and inexpensive article which is adapted to be attached to one end of a loop and make an adjustable connection with the other portion of a loop, and also prevent any slip occurring when the cord is put under tension. The invention is applicable for use in connection with all kinds of looped cords where adjustment is made by varying the length of the loop without knotting or unknotting the cord for effecting this purpose.

According to this invention the grip comprises a member formed with open sided apertures and an eyelet, hook, or other means of attachment for one end of a rope, cord, or the like, a portion of the cord being passed through one open sided aperture, twisted over the member and passed through another open sided aperture, these operations being repeated as many times as there are open sided apertures in the member.

In the accompanying drawings:—

Figs. 6 and 7 are similar views to Figs. 1 and 2 showing a construction of grip for large ropes, and Fig. 8 shows a modified construction of grip.

Figure 1:
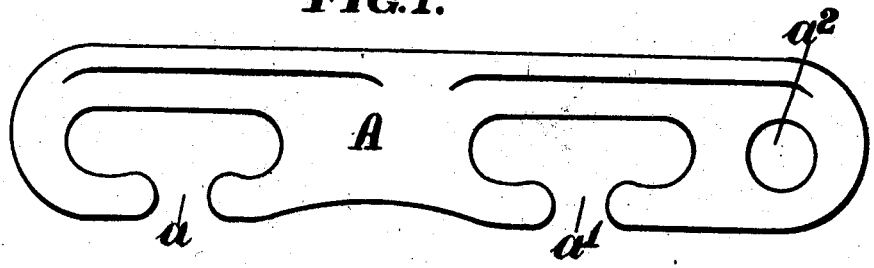
Fig. 1 is a plan, and Fig. 2 a side elevation of a cord grip constructed in accordance with this invention.
Figure 2:
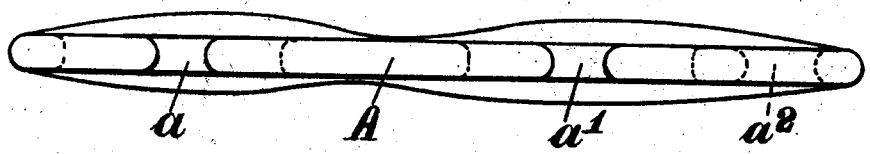
Figure 3:
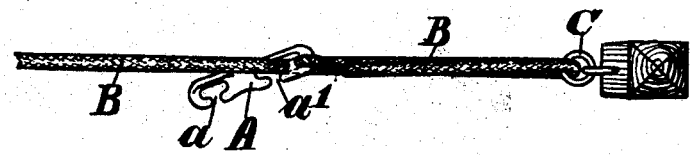
Figs. 3, 4 and 5 illustrate the three stages of securing a cord on the grip.
Figure 4:
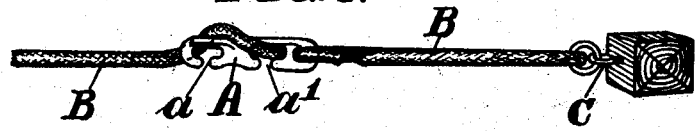
Figure 5:
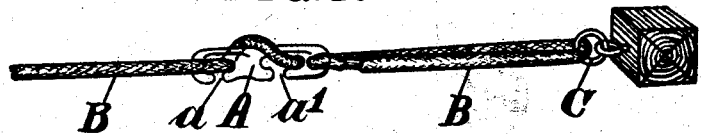

In the example shown the aforesaid member comprises an oblong plate A which is formed with two open sided apertures $a$ $a^1$ and an eyelet $a^2$ or a hook, or other means for attachment to one end of the cord. The apertures $a$ $a^1$ are shown with their openings situated at one edge of the plate, but the openings may if desired be arranged at opposite edges of the plate and in either case the openings may be made slightly narrower than the diameter of the cord B so that the latter becomes slightly compressed as it is passed through the opening. When the openings are arranged along one edge of the plate, an intermediate portion of the other edge may be recessed slightly and rounded where the cord crosses over the plate as shown in Fig. 5 in its passage from one aperture to the other. The ends of the apertures against which the cord presses when put in a state of tension are also advantageously rounded as shown in Fig. 2. This construction enables the plate to be slid along the cord in one direction or the other for adjustment purposes, but when tension is applied to the cord, the plate acts as a lock and securely holds the cord from slipping. To use the device one end of the cord is attached to the hook or eyelet as shown in Fig. 3. The cord is then looped around some fixture C. A portion of the cord is then passed through one of the open sided apertures as shown in Fig. 3, twisted round the curved edge of the plate as shown in Fig. 4 and then passed through the other open sided aperture as shown in Fig. 5. If desired more than two open sided apertures may be formed in the plate. In the example shown in Figs. 6 and 7 the plate is formed with a flanged ring $a^3$ around which the end of the cord is looped and secured.

The apertures constitute longitudinal slots in the elongated plate which are spaced longitudinally from one another, with each slot provided with an entrance between its ends and extending to one edge of the plate. The end portions of the slots are rounded to accommodate the flexible element for which the grip is intended and said curved end portions extend through slightly more than one-half of a circle. Thus, the flexible element may slide freely within the end portions of the slots when said flexible element is slackened, and said rounded end portions provide restricted throats of reduced width between said rounded portions and entrances of the slots, so as to pinch the flexible element when it is tightened.

In the modification shown in Fig. 8 the grip is constructed from a length of wire D formed at one end with a hook or eyelet $d$ for attachment to one end of the rope or cord B, the said hook or eyelet being formed with a tail piece $d^1$ which acts as a locking device in the manner hereinafter described. The other end of the grip is formed with a hook $d^2$ which is cranked in relation to the other hook and occupies a position at an angle to it, that is to say when one hook is placed in a vertical position, the other hook may occupy a more or less horizontal position. The open end of the cranked hook is restricted at $d^3$ so that it will act as a retaining device to prevent the rope or cord from accidentally getting out of position.

To use the device the rope B with the hook or eyelet attached to it is passed around a post or other point of attachment to form a loop and the hook $d^2$ is then pressed over the rope so as to complete the loop. The grip is now slid along the rope in one direction or the other to effect the required adjustment and a portion of the rope between the point of attachment and the cranked hook is then passed over the tail piece $d^1$ from one side to the other to cause the rope to take a bend around the cranked portion of the hook in which position it becomes held fast.

What I claim as my invention and desire to secure by Letters Patent in the United States is:—

A grip for a cord, rope or other similar flexible element, comprising an elongated plate having a plurality of longitudinal slots spaced longitudinally from one another to receive the flexible element and each slot being provided with an entrance between its ends extending to one edge of the plate, the end portions of the slots being rounded to accommodate the flexible element for which the grip is intended and extending through slightly more than one-half of a circle, so as to permit free sliding movement of the flexible element within said end portions of the slots when the flexible element is slackened, and so as to form restricted throats of reduced width between said rounded portions and entrances to pinch the flexible element when it is tightened.

In testimony whereof I affix my signature.

JAMES HENRY DUERDEN.